July 17, 1951 H. A. SHABAKER 2,560,604
MANIPULATION OF FLUENT SOLIDS
Filed Dec. 31, 1948 2 Sheets—Sheet 1
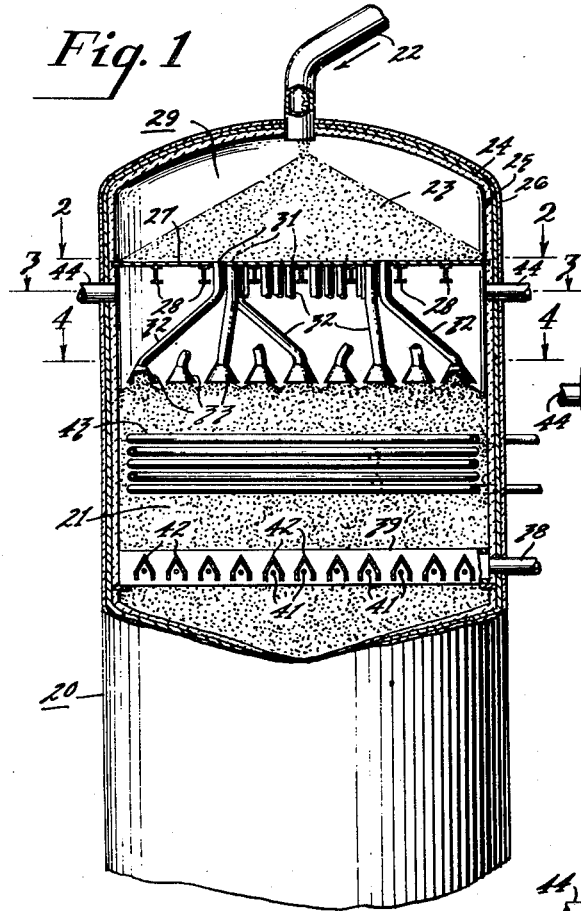
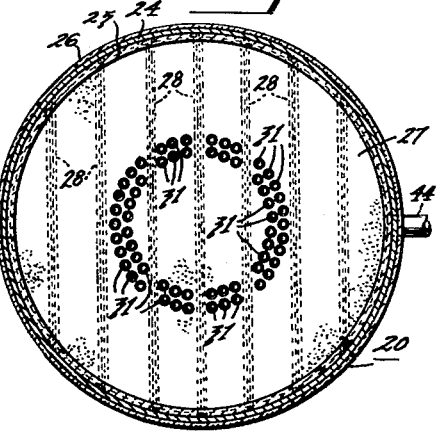
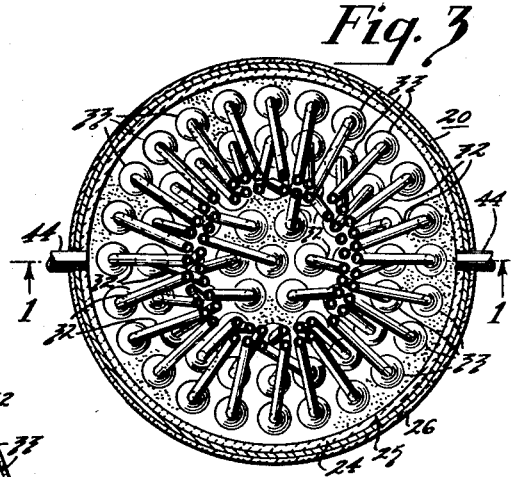
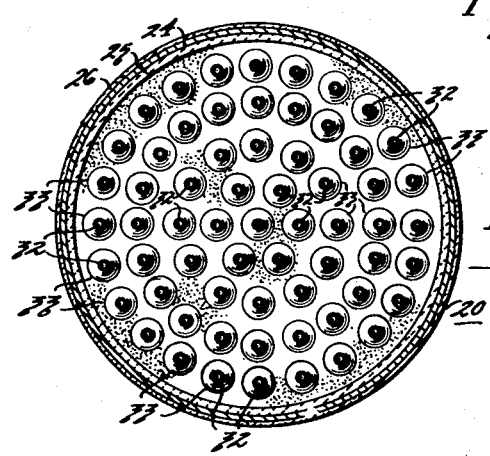
INVENTOR
Hubert A. Shabaker
BY
Frank Wm Rose July 17, 1951 — H. A. SHABAKER — 2,560,604
MANIPULATION OF FLUENT SOLIDS
Filed Dec. 31, 1948 — 2 Sheets-Sheet 2
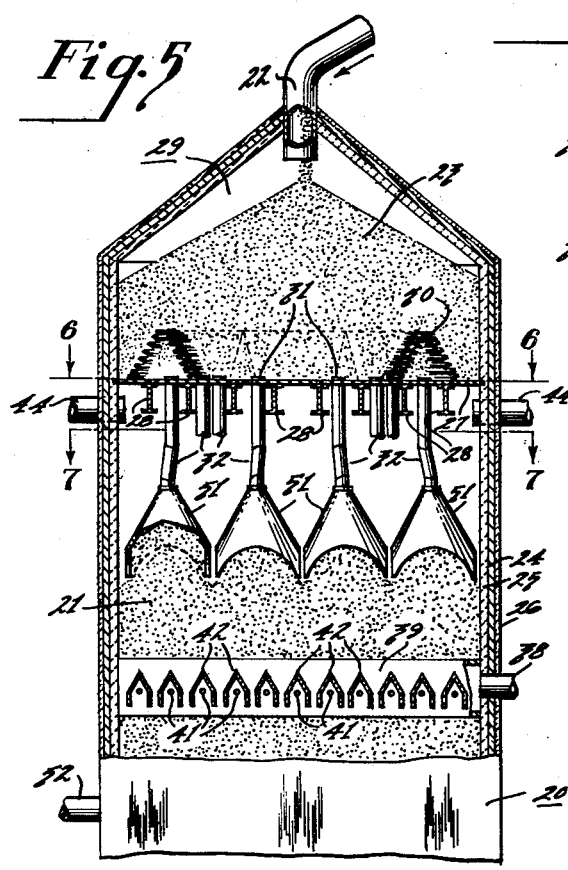
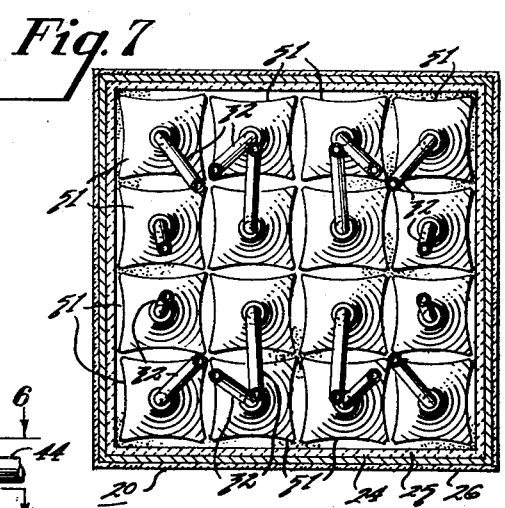
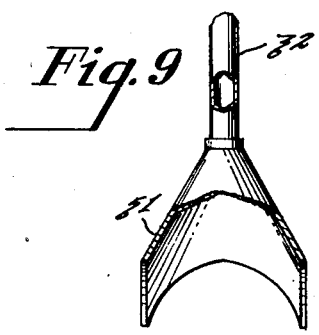
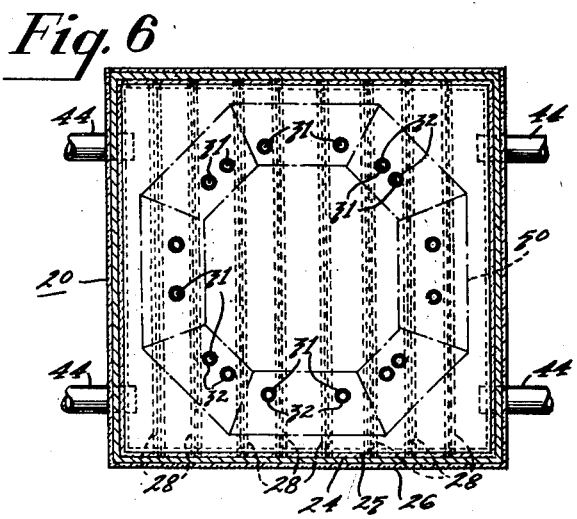
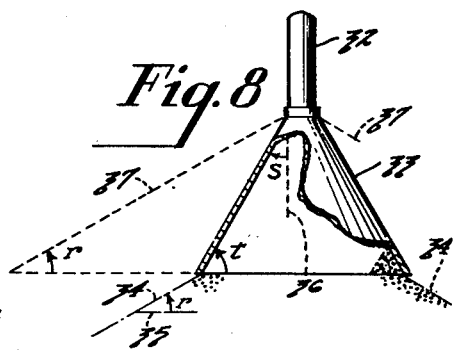
INVENTOR
Hubert A. Shabaker
BY
Frank Wm Rose Patented July 17, 1951

2,560,604

UNITED STATES PATENT OFFICE 2,560,604

MANIPULATION OF FLUENT SOLIDS

Hubert A. Shabaker, Media, Pa., assignor to Houdry Process Corporation, Wilmington, Del., a corporation of Delaware Application December 31, 1948, Serial No. 68,683

14 Claims. (Cl. 196—52)

The use of moving bodies of fluent solid particles in processes that involve the contact of masses of such solid particles with fluids, as, for example, catalytic conversions of organic vapors by solid catalysts, such as the catalytic cracking of hydrocarbons, has resulted in certain advantages due to the continuous nature of the process but has also created problems arising from the nature of the process. One such problem involving the introduction of the fluent solid particles to the contacting zone or chamber may be overcome by using methods and apparatus embodying the present invention.

An obviously desirable and sometimes essential condition for the uniform contact of a contact mass or body of solid particles with a fluid in a contacting zone is that the body of particles be uniform in average size over the cross sectional area of the body normal to the direction of flow of the fluid since otherwise the flow of the fluid through various portions of the body is unequal with resultant inequalities in the time of contact or extent of treatment or both and, if heat effects are present, with resultant inequalities in the temperature of various portions of the body. Such effects are particularly noticeable when the body of solid particles is a non-turbulent bed which moves downwardly under the influence of gravity as essentially a fluent mass or bed of particles.

A considerable variation in the size of the particles employed in such processes is often encountered when the operation of the process has continued over an extended period of time because of the development, by attrition, of a range of particle sizes. This will occur even though the particles constituting the original contact mass were initially of the same size, which is not always the case due to variations encountered in the manufacture of the solid particles. Another factor contributing to the variation in particle size is the common practice of adding fresh particles to the system from time to time to compensate for particles reduced to such a fine size that they are intentionally removed from the system or are carried out by effluent gases or fluids.

Thus, a typical used contact mass consisting of particles whose size was originally in a range between 4 to 8 mesh may have as much as 7 percent of particles between 8 and 10 mesh and 15 percent of particles smaller than 10 mesh in addition to material in the original range after six months of operation. (Percentages given herein are on a weight basis unless otherwise specified.)

It is known that a mass of fluent solid particles varying in size has a tendency to segregate so as to develop portions containing predominantly particles of larger size and other portions containing predominantly particles of smaller size when subjected to flow down an inclined path (i. e., flowing a mass of such particles down an inclined path results in a non-uniform distribution of particles of the same size over the cross section of said mass normal to the direction of flow even though the mass originally has a uniform distribution in respect to particle size). This effect is encountered in flow down an inclined pipe or in the discharge of solid particles in a relatively small zone (as from a pipe) above the top or apex of a relatively large body or pipe of such particles, when the upper surface of the body is free or unrestricted and hence inclined at the free angle of repose of the solid particles with the horizontal so that the particles flow or roll down the free upper surface.

The latter condition obtains when a stream of solid particles is fed to a contacting zone whose lateral cross sectional area is considerably greater than the cross sectional area of the supplying stream and is exemplified in most contacting vessels containing moving non-turbulent beds of solid particles. Under these conditions, the larger particles apparently roll down the free upper surface of the pile or piles constituting the upper surface of a bed (the free upper surface of each pile being roughly conical) at a faster rate than do the smaller particles. At any event, experiment has shown that the finest particles tend to accumulate directly below the point of discharge and that the average particle size increases in a direction radial from the vertical line on which the point of discharge lies, the largest particles thereby being concentrated at the periphery of the pile. It is therefore obviously undesirable to supply solid particles as a single stream of restricted cross section.

Moreover, when introducing solid particles to a contacting zone it is preferable, because of possible variations in the supply rate, to have a supply chamber containing a body or pile of solid particles, from which chamber the solid particles are fed to the contacting zone and which has sufficient capacity to maintain a constant rate of flow of solid particles to the contacting zone during variations in the rate at which the solid particles are fed to the supply chamber. If, however, the solid particles are discharged as streams located at points evenly distributed over the bottom of the pile of solid particles in the supply chamber (i. e., the points of discharge are located at the intersections of a square grid), these streams will contain particles whose average size varies considerably due to the segregation effects described above.

In accordance with the present invention, fluent solid particles varying in size as described above are supplied or fed to a contacting zone of considerable horizontal extent in a manner, described more fully below, such that approximately constant distribution of particles of the same size is effected over substantially the entire horizontal cross sectional area of the contacting zone by supplying said particles to a body of said particles located above the contacting zone, and discharging said solid particles from a small fraction of the area of the bottom of said body. The particles are advantageously discharged at a multiplicity of points located so that the range of size of particles discharged at a point is substantially the same as that at any other point (i. e., discharge of the particles from the body in the supply chamber is effected without segregation). The particles so discharged are moved downwardly in compact non-turbulent flow to the surface of a non-turbulent bed in the contacting zone and, in the course of the movement, the total horizontal area through which said solid particles flow is expanded while, at the same time, the flow of solid particles is confined so that the outermost angle of flow is less than the angle of repose until the total expanded area is a substantial portion of the horizontal area of the surface of the bed in the contacting zone.

The principles involved in the present invention are set forth in detail below in connection with the description of the drawings in which various preferred embodiments of the present invention are shown. It is to be understood that these preferred embodiments are to be regarded as illustrating the present invention rather than as restricting its scope. In the drawings:

Figures 1 and 5 are vertical views of the upper portions of vessels containing moving beds of solid particles with portions of the vessels broken away for a better view of the relationship of the parts;

Figures 2, 3 and 4 are horizontal sections of the vessel illustrated in Figure 1 taken along the lines 2—2, 3—3 and 4—4, respectively, showing the relationship of the parts of the apparatus at this level;

Figures 6 and 7 are transverse sections of the vessel illustrated in Figure 5 along the lines 6—6 and 7—7, respectively, showing the relationship of the parts of the apparatus at these levels;

Figures 8 and 9 are enlarged detailed views of cone elements in Figures 1 and 5, respectively.

Shown in Figure 1 is the upper portion of a closed housing or vessel indicated generally at 20 containing a downwardly moving non-turbulent bed of solid particles 21 which are contacted with fluids as described below. Solid particles are introduced to the housing by means of pipe or conduit 22 which contains a stream of particles only partially filling it and from which the stream of particles discharges at the top or apex of a large body or pile 23 of solid particles in a relatively small zone (i. e., the diameter of the stream of particles impinging on the top of the body or pile is relatively small in respect to its horizontal extent). The body of particles is of substantial horizontal extent and is confined by the sides 24 of housing 20, which may be lined with a refractory lining 25 and covered by a layer of insulation 26, and by plate or sheet 27 which is supported within the housing by beams 28. Sides 24 and plate 27 form a fluent particle supply or introduction chamber (indicated generally at 29) located above the contacting zone (which comprises all or a part of bed 21 as described below) and within the housing, which supply chamber contains bed 23. Preferably, chamber 29 has sufficient capacity so that body 23 does not completely fill it, the upper surface of body 23 being free and therefore inclined to the horizontal at the free angle of repose of the solid particles of which the body is composed.

As stated above, body 23 and hence supply chamber 29 are of substantial horizontal extent, thus providing room for a multiplicity of outlets 31 in plate 27, whose function is described below. In the embodiment of the invention shown in Figure 1, the supply chamber is within housing 20 and is of identical horizontal extent as the horizontal extent of bed 21 in the contacting zone. However, the supply chamber may be placed outside of the housing and horizontal extent of the supply chamber and the body of solid particles therein may be different from the horizontal extent of the contacting zone. In such cases, the horizontal extent of the bed in the contacting zone and the body of particles in the supply chamber are preferably of the same order of magnitude, the latter preferably being not less than about ⅓ nor more than about twice the horizontal extent of the former.

Solid particles are removed from the bottom of body 23 as a multiplicity of solid streams through a multiplicity of outlets 31 in the bottom of chamber 29, which outlets individually communicate with the open upper ends of conduits 32. (The term solid streams is used in the sense that the conduits are substantially filled with solid particles. In other words, the particles flow through the conduits in compact non-turbulent flow.) As can be seen from Fig. 2, the total area of outlets 31 is only a small fraction, such as 10 percent or less of the total horizontal area of body 23.

Outlets 31 in plate 27 are arranged equidistantly away from the center of body 23, which center is on the same vertical line as the point of discharge from conduit 22 so that the locus of the outlets forms a circle whose center is the center of supply chamber 29. Outlets 31 are preferably arranged at approximately regular intervals around the circle thus providing a symmetrical distribution, although in some instances it is necessary to avoid beams 28 which support plate 27. In general, the radius of the circle on which the outlets 31 lie is approximately one half to two thirds of the average distance between the center of the chamber and the sides thereof. In any event, they are arranged so as to provide average small lateral distances of travel between the upper and lower ends of conduits 32 with whose open upper ends the outlets communicate.

When the average lateral distances between the upper and lower ends of conduits 31 is small, the solid particles therein are subjected to only a short distance of travel down an inclined path and hence segregate as little as possible in a direction normal to the axis of the conduit.

As noted above, when a stream of solid particles is discharged on the top or apex of a body of particles such as body 23 as described herein, the particles tend to move outwardly from the center of the body in a regular manner. One consequence of this behavior is that the particles in any circular annulus concentric with the center of the body have approximately the same distribution in particle size. It is therefore apparent that the particles discharged from the bottom of body 23 through outlets 31 will have the same particle size distribution. Moreover, it has been found experimentally, that although initially the average particle size increases in a radial direction from the center of the body, under equilibrium conditions such as are encountered when the process has been under operation for some time, the size distribution of the particles withdrawn through the outlets will be the same as that supplied to the top of the body. Apparently the particles initially segregate when the body is formed and thereafter the material supplied to the top of the body follows such a path downwardly through the bed that the solid particles withdrawn from the bottom in the manner described have not segregated, the initially segregated particles remaining static. Thus, the range of particle sizes discharged from any point in a circular annulus, such as one of outlets 31, is the same as that discharged from any other point or outlet.

As may be seen in Figure 1, conduits 32 extend downwardly from plate 27, which forms the top of the contacting chamber, to a vertical level below but close to the top of the chamber. The lower ends of conduits 32 are disposed and arranged so that they discharge streams of catalyst uniformly and regularly over the area of bed 21. (In the embodiment of the invention described in connection with Figure 5 described more fully below the lower ends of conduits 32 are disposed individually at the centers of a multiplicity of equal area rectilinear subdivisions of the horizontal cross sectional area of bed 21.) Conduits 32 terminate in upwardly tapering truncated cones 33 each of which are open at the bottom thereof and each of which are joined or affixed to and communicate with the open lower ends of a conduit 32. Because the particles in the conduits are in compact flow, the particles moving downwardly from the supply chamber 29 to the contacting zone flow through a total horizontal area which starts to expand as the particles enter the cone and thereafter continues to expand outwardly while being confined by the sides of the cones. The stream of particles, when below the base of cones 33, freely expands and hence the outermost particles move outwardly at more rapid rate than above the base of the cone. The upper surface of this freely expanding stream of particles (indicated by lines 34 in Figure 8) is inclined to a horizontal plane (indicated by line 35 in Figure 8) at an angle $r$, which is the angle of repose of the particles.

As may be seen in Figure 8, the outermost angle of flow of the particles within the cone is $s$, which angle is defined by the inclination of the sides of the cone with a vertical line (indicated as dotted line 36). The angle of the sides of the cones $t$ is the complement of angle $s$. It has been found that the greater the angle of the cone (the less the angle of flow), the less segregation occurs during expansion (i. e., the more the rate of expansion is controlled so as to be more gradual, the less segregation occurs). As a practical matter, the angle cannot be too steep since this would disadvantageously increase the height of the vessel. At any event the final expanded area, which is the area of the base of the cone, should be a substantial portion of the horizontal area of the surface of bed 21 so that the particles do not have any considerable distance to roll down under free expansion conditions. The area at the base of the cones should generally be more than 25 percent and preferably more than 40 to 50 percent of the area of the horizontal area of the surface of bed 21 to realize the advantages of the invention. If the cone did not confine the particles emerging from conduit 32, they would form a pile, as indicated by dotted lines 37, inclined to the horizontal at the angle of repose $r$.

Consideration of Figure 8 shows that the outermost angle of flow within the cone $s$ is less than the complement of the angle of repose $r$ under the conditions set forth. Most common fluent solids have an angle of repose lying between 30 and 40° and it is therefore preferred to employ cones having an angle of flow $s$ less than about 45° and generally about 30° or less. Since the angle of the sides of the cone $t$ is the complement of the angle of flow, it is accordingly clear that the sides of the cone should be inclined at an angle of more than about 45°, and preferably about 60° or more to the horizontal base (and hence substantially greater than the angle of repose).

Bed 21 may be employed in a variety of ways to effect desired contact between gas and fluent solid. When employed in a hydrocarbon conversion system, vessel 20 may be either a reactor where hydrocarbons are contacted with fluent solid catalyst under conversion conditions or a regenerator or kiln where coked catalyst is contacted with oxygen-containing gases under combustion conditions. In the latter case, the vessel may contain either a single zone or a multiplicity of zones. For example, Figure 1 illustrates the top zone of such a vessel. Oxygen-containing gas may be introduced through conduit 38 and be distributed by hollow beam 39 through a plurality of orifices 41 to inverted troughs 42, which troughs distribute the gas evenly over the horizontal area of the bed. The gas may then pass upwardly through the bed, which is cooled by cooling coil 43, and be disengaged from the upper surface of bed 21 and thereafter removed from the vessel by conduits 44. The catalyst moves downwardly by gravity as a non-turbulent bed and is removed by withdrawal devices at the bottom of the vessel (not shown), such as are known to the art (see, for example, U. S. Patent 2,412,136 issued on December 3, 1946, to L. P. Evans et al).

In Figures 5, 6, 7 and 9 is illustrated another embodiment of the invention. (In these figures, parts or elements having the same or similar functions to those in previous figures have been numbered identically.) The solid particles flow downwardly from conduit 22 to chamber 29 and thence to conduits 32, the entrance to which is protected by grating 50. Conduits 32 discharge at the centers of a multiplicity of equal area square subdivisions of the horizontal area of bed 21. Cones 51, dependent from the lower ends of conduits 32 have been cut at the sides as shown in Figure 9 so that the expansion of the streams of particles in conduits 32 to form bed 21 is effected substantially completely under confined conditions, since the total area under cones 51 is nearly equal to the horizontal area of bed 21. In order to achieve this effect, cones 51 have been cut vertically at the sides to produce a substantially square horizontally projected cross section. Alternatively cones 51 may be shaped in the form of square pyramids whose sides are inclined as stated above or other geometric forms may be used for either cones 51 or cones 33. Also, the vessel may be designed so that the expansion of the stream of particles starts immediately upon discharge from body 23 (i. e., conduits 32 are omitted under these conditions).

Since the upper surface of the bed in Figure 5 is not free to a sufficient extent as to provide adequate disengagement surface for any considerable amount of gas it is preferred to introduce gas by conduit 52, which communicates with a vapor distributing device (not shown) which is the same or similar to that formed by beam 39, orifices 41 and troughs 42. The gas, after introduction uniformly over the horizontal extent of bed 21, passes at least in part upwardly and is removed through conduit 38.

As can be seen from consideration of the various embodiments described above, the present invention includes within its scope a variety of forms of apparatus for accomplishing the purpose of feeding solid particles of uniform size distribution to a contact zine. A contact zone such as that involved in the present invention may be employed for variety of purposes and processes. Thus the present invention will be found useful in the field of hydrocarbon conversion processes effected by the contact of hydrocarbon fluids with solid catalysts such as the operations of cracking, reforming, hydroforming, hydrogenation, desulphurization, vis-breaking and the like or in the field of processes using inert granular contact masses which may be porous or relatively impervious such as thermal vis-breaking with an inert mass, thermal cracking of hydrocarbon oils to gases, heat transfer and the like.

Exemplary of such processes is the hydrocarbon catalytic cracking process. In accordance with the present invention, the bulk of the solid catalyst particles are preferably within a size range of from more than about 0.01 to less than about 0.5 inch, the ratio of the largest 5 percent of such particles to the smallest 5 percent generally being less about 20 to 1 and preferably between about 5 to 1 and 10 to 1. Such particles may be fed by the methods described above, using the same or similar apparatus, to either a cracking zone for contact therein with hydrocarbon fractions, such as fractions boiling above gasoline, at cracking temperatures in the range of 650 to 1100° F., or catalyst which has been coked (i. e., accumulated a hydrocarbonaceous deposit, commonly called coke) as a result of contact with hydrocarbon fractions in a cracking operation may be fed to a regeneration zone to be contacted therein with a combustion supporting gas for the removal of a portion or all of the coke deposited on the catalyst. Processes involving such cracking and regeneration operations are well known to the art; for example, a description of a typical process related to the present invention is set forth in "The 'T. C. C.' cracking process for motor gasoline production" by R. H. Newton, G. S. Dunham and T. P. Simpson, "Transactions of the American Institute of Chemical Engineers," volume 41, page 215, April 25, 1945, and in the articles there cited.

It has been found that, in the operation of commercial size plants, excellent results are obtained with particles of the size described above when the conduits discharging the catalyst on the top of the bed in the contacting zone are spaced between 4 to 18 inches apart.

Contact masses for such processes may consist of appropriately sized particles of natural or artificial aluminosilicates, the latter being of the synthetic gel type, or other synthetic gel cracking catalysts such as catalysts containing silica and other refractory oxides. Typical contact masses from natural products are described in U. S. Patent 2,078,945 issued on May 4, 1937, to E. J. Houdry and from synthetic gels in U. S. Patent 2,429,981 issued on November 4, 1947, to J. R. Bates.

In other processes of the heat transfer or thermal cracking type, the particles may be composed of one or more refractory oxides, such as silica, zirconia, alumina, and may be in a porous or fused state. Also useful are dead burned ores, ground slag, sized heat resistant rocks or pebbles, such as quartz, inactive cracking catalyst and the like.

It has been found that the use of the methods of feeding the catalyst to such zones as described herein increases the efficiency of the contact of the catalyst particles with the hydrocarbon fluids or of combustion supporting gases with resultant increases of yield of the desired products of the cracking reaction or in superior control of the regeneration operation with resultant economies in catalyst life and/or rapidity of regeneration. Also due to the increase in efficiency of contact, higher rates of throughput may be maintained and valuable economies in operation may thereby be effected.

Obviously many modifications and variations of the invention as hereinbefore set forth may be made without departing from the spirit and scope thereof and therefore only such limitations should be imposed as are indicated in the appended claims.

I claim as my invention:

1. A method for the introduction into a fluid contacting zone of fluent solid particles varying in size over a range such that flowing a mass of said particles down an inclined path results in a non-uniform distribution of particles of the same size over the cross section of said mass normal to the direction of flow, which method comprises supplying said particles to a body of said particles located above said contacting zone, discharging said particles from the bottom of said body at a multiplicity of points, moving the particles so discharged downwardly in compact non-turbulent flow to the surface of a non-turbulent bed of said particles in said contacting zone and, in the course of the movement, expanding the total horizontal area through which said solid particles flow while confining the outermost angle of flow of said particles to less than the complement of the angle of repose of said particles until the total expanded area is a substantial portion of the horizontal area of the surface of said bed and passing fluid through said non-turbulent bed.

2. The method of claim 1 in which the fluids contacted in said fluid contacting zone are hydrocarbons, the solid particles comprise hydrocarbon conversion catalyst and hydrocarbon conversion conditions are maintained in said contacting zone.

3. The method of claim 1 in which the solid particles comprise a deposit of coke accumulated as a result of prior contact with hydrocarbons, the fluid contacting said particles is an oxygen containing gas and combustion conditions are maintained in said contacting zone.

4. A method for the introduction into a fluid contacting zone of fluent solid particles varying in size over a range such that flowing a mass of said particles down an inclined path results in a non-uniform distribution of particles of the same size over the cross section of said mass normal to the direction of flow, which method comprises supplying said particles to a body of said particles located above said contacting zone, discharging said particles from the bottom of said body at a multiplicity of points located so that the range of size of particles discharged at a point is substantially the same as that at any other point, moving the particles so discharged downwardly in compact non-turbulent flow to the surface of a non-turbulent bed of said particles in said contacting zone and, in the course of the movement, expanding the total horizontal area through which the transferred solid particles flow while confining the outermost angle of flow of said particles to less than the complement of the angle of repose of said particles until the total expanded area is a substantial portion of the horizontal area of the surface of said bed.

5. A method for the introduction into a fluid contacting zone of fluent solid particles varying in size over a range such that flowing a mass of said particles down an inclined path results in a non-uniform distribution of particles of the same size over the cross section of said mass normal to the direction of flow, which method comprises supplying said particles to a body of said particles located above said contacting zone, discharging said particles from a small fraction of the area of the bottom of said body at a multiplicity of points located equidistantly away from the center of said body, moving the particles so discharged downwardly in compact non-turbulent flow to the surface of a non-turbulent bed of said particles in said contacting zone and, in the course of the movement, expanding the total horizontal area through which the transferred solid particles flow while confining the outermost angle of flow of said particles to less than the complement of the angle of repose of said particles until the total expanded area is a substantial portion of the horizontal area of the surface of said bed.

6. A method for the introduction into a fluid contacting zone of fluent solid particles varying in size over a range such that flowing a mass of said particles down an inclined path results in a non-uniform distribution of particles of the same size over the cross section of said mass normal to the direction of flow, which method comprises supplying said particles to a relatively small zone at the top of a body of said particles located above said contacting zone, said body of particles being of approoximately the same horizontal extent as that of the contacting zone and being confined at its sides and bottom but having a free upper surface inclined at the angle of repose of said particles, discharging said particles from the bottom of said body as a multiplicity of solid streams of said particles, said streams being located equidistantly away from the center of said body, moving the particles so discharged downwardly in compact non-turbulent flow to the surface of a non-turbulent bed of said particles in said contacting zone and, in the course of the movement, expanding the total horizontal area through which the transferred solid particles flow while confining the outermost angle of flow of said particles to less than the complement of the angle of repose of said particles until the total expanded area is a substantial portion of the horizontal area of the surface of said bed.

7. The method of claim 6 in which streams of particles discharged from said body are directed individually to the centers of a multiplicity of approximately equal area subdivisions of the horizontal area of the surface of said bed.

8. The method of claim 6 in which the total expanded area is nearly equal to the horizontal area of the surface of said bed.

9. The method of claim 6 in which said solid streams of particles are discharged from the bottom of said body at points spaced at regular intervals around an annular locus concentric with the center of said body, the radius of said annular locus being between about half to two thirds of the average distance between the center of said body and the sides thereof, and in which the outermost angle of flow of said particles during expansion of flow is less than thirty degrees.

10. The method of claim 6 in which the solid particles comprise hydrocarbon conversion catalyst and the bulk of said particles are within a size range of more than about 0.01 and less than about 0.5 inch, the ratio of the average size of the largest 5 percent and the smallest 5 percent of said particles being between about 5 to 1 and 20 to 1.

11. In apparatus for the contact of solid particles and fluids in a contacting chamber, said apparatus comprising a closed housing containing said contacting chamber, means for the removal of said solid particles from said contacting chamber and from said housing, and means for the introduction of fluids to said housing and to said contacting chamber, and means for the removal of said fluids from said housing and from said contacting chamber, the combination thereof with a supply chamber adapted to contain a large body of said particles and located above said contacting chamber, outlets in the bottom of said supply chamber for the removal of solid particles, said outlets being located equidistantly away from the center of said supply chamber, and solid particle transferral means communicating with said outlets adapted to form confined streams of solid particles which move downwardly from said supply chamber to said contacting chamber and adapted to direct solid particles over a substantial fraction of the area of said contacting chamber, said transferral means comprising means for expanding the area of flow of solid particles while confining the outermost angle of flow to less than about forty-five degrees.

12. In apparatus for the contact of solid particles and fluids in a contacting chamber adapted to contain a bed of such particles, said apparatus comprising a closed housing containing said contacting chamber, means for the removal of said solid particles from said contacting chamber and from said housing, and means for the introduction of fluids to said housing and to said contacting chamber, and means for the removal of said fluids from said housing and from said contacting chamber, the combination thereof with a supply chamber adapted to contain a large body of said particles and located above said contacting chamber, a plurality of outlets in the bottom of said supply chamber for the removal of solid particles from the bottom of said supply chamber at points located equidistantly away from the center of said supply chamber, the total area of said outlets being a small fraction of the total horizontal area of the bottom of said supply chamber, a plurality of conduits communicating individually with said outlets and extending downwardly from the bottom of said supply chamber to a vertical level below but close to the top of said contacting chamber, and an upwardly tapered truncated cone open at the bottom and affixed to and communicating with the open lower end of each of said conduits, the angle of said cones with the bases thereof being greater than about forty-five degrees.

13. The apparatus of claim 11 in which said plurality of outlets are located at points spaced at regular intervals around an annular locus concentric with the center of said supply chamber, the radius of said annular locus being between about one half to two thirds of the average distance between the center of said supply chamber and the sides thereof, and in which the total horizontal area of the base of said cones is a substantial portion of the horizontal cross sectional area of said contacting chamber.

14. The apparatus of claim 11 in which said cones have a rectilinear projected horizontal cross section and in which the total projected horizontal cross sectional area of said cones is nearly equal to the horizontal cross sectional area of said contacting chamber.

HUBERT A. SHABAKER.

REFERENCES CITED

The following references are of record in the file of this patent:

UNITED STATES PATENTS

| Number | Name | Date |
|---|---|---|
| 2,421,840 | Lechthaler et al. | June 10, 1947 |
| 2,477,281 | Bergstrom | July 26, 1949 |